(12) United States Patent
Takano et al.

(10) Patent No.: US 7,414,674 B2
(45) Date of Patent: *Aug. 19, 2008

(54) METHOD AND APPARATUS FOR AUTOMATICALLY SWITCHING BETWEEN ANALOG AND DIGITAL INPUT SIGNALS

(75) Inventors: Hiroshi Takano, San Diego, CA (US); Atsushi Suzuki, Matsudo (JP); Shigeharu Kondo, Yokohama (JP); Takashi Otani, Soka (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 596 days.

This patent is subject to a terminal disclaimer.

(21) Appl. No.: 11/103,882

(22) Filed: Apr. 11, 2005

(65) Prior Publication Data

US 2005/0179822 A1 Aug. 18, 2005

Related U.S. Application Data

(63) Continuation of application No. 09/978,478, filed on Oct. 16, 2001, now Pat. No. 6,961,099.

(51) Int. Cl.
H04N 5/445 (2006.01)
(52) U.S. Cl. .................................................. 348/705
(58) Field of Classification Search ................. 348/705, 348/706, 552, 553, 55, 58, 584, 598, 722; 725/37, 38, 141
See application file for complete search history.

(56) References Cited

U.S. PATENT DOCUMENTS

| | | | | |
|---|---|---|---|---|
| 4,301,475 A | * | 11/1981 | McCoy | 348/584 |
| 4,808,992 A | | 2/1989 | Beyers, Jr. et al. | 340/825 |
| 5,382,982 A | * | 1/1995 | Enomoto | 348/706 |
| 5,420,856 A | * | 5/1995 | Kerns | 370/359 |
| 5,438,375 A | | 8/1995 | Sasabe et al. | 348/706 |
| 5,553,140 A | | 9/1996 | Kubota et al. | 380/10 |
| 5,621,659 A | | 4/1997 | Matsumoto et al. | 364/514 |
| 5,684,543 A | | 11/1997 | Kobayashi | 348/705 |
| 5,719,637 A | | 2/1998 | Ohkura et al. | 348/564 |

(Continued)

FOREIGN PATENT DOCUMENTS

EP 1 102 435 A2 5/2001

(Continued)

OTHER PUBLICATIONS

TA Document 1999039, AV/C Panel Subunit Specification 1.0. 1394 Trade Association The Multimedia Connection, Jul. 10, 2000, pp 1-152.

(Continued)

*Primary Examiner*—Paulos M Natnael
(74) *Attorney, Agent, or Firm*—Haverstock & Owens LLP

(57) ABSTRACT

An entertainment system includes a digital television connected to a number of audio/video input devices. The television and at least two of the input devices support analog legacy communication schemes. The television is adapted to uniquely identify the analog output channels from each of the input devices. Uniquely identifying the analog output channels from each input device enables the television to automatically select the correct device output from among the numerous possibilities. This automation relieves the user of having to manually select the correct analog channel.

8 Claims, 5 Drawing Sheets

U.S. PATENT DOCUMENTS

| | | | |
|---|---|---|---|
| 6,032,202 A | 2/2000 | Lea et al. | 710/8 |
| 6,038,625 A | 3/2000 | Ogino et al. | 710/104 |
| 6,085,236 A * | 7/2000 | Lea | 709/220 |
| 6,133,910 A * | 10/2000 | Stinebruner | 725/49 |
| 6,486,925 B1 * | 11/2002 | Ko | 348/731 |
| 6,490,009 B1 * | 12/2002 | Asakura | 348/705 |
| 6,516,467 B1 * | 2/2003 | Schindler et al. | 725/153 |
| 6,801,957 B1 | 10/2004 | Sadanaka et al. | 710/16 |
| 6,961,099 B2 * | 11/2005 | Takano et al. | 348/705 |
| 7,102,692 B1 * | 9/2006 | Carlsgaard et al. | 348/572 |
| 2001/0018768 A1 * | 8/2001 | Horiguchi et al. | 725/80 |
| 2002/0171763 A1 * | 11/2002 | Stecyk et al. | 348/552 |
| 2002/0194596 A1 * | 12/2002 | Srivastava | 725/37 |
| 2005/0195206 A1 * | 9/2005 | Wogsberg | 345/547 |

FOREIGN PATENT DOCUMENTS

| | | |
|---|---|---|
| EP | 1 104 134 A2 | 5/2001 |
| EP | 1 176 822 A2 | 1/2002 |
| WO | WO 01/28255 A1 * | 4/2001 |

OTHER PUBLICATIONS

TA Document 1998001, AV/C Digital Interface Command Set General Specification, Version 2.0.1. 1394 Trade Association The Multimedia Connection, Jan. 5, 1998, pp. Title, ii=iv and 1-40.

TA Document 1999028, AV/C Monitor Subunit Model and Command Set Version 1.0. 1394 Trade Association The Multimedia Connection, Oct. 24, 2000 pp. 1-25, Draft EIA-775, DTV 1394 Interface Specification, Oct. 29, 1998, pp. i-viii and 1-114.

* cited by examiner

METHOD AND APPARATUS FOR AUTOMATICALLY SWITCHING BETWEEN ANALOG AND DIGITAL INPUT SIGNALS

This is a continuation application of U.S. patent application Ser. No. 09/978,478, filed Oct. 16, 2001 now U.S. Pat. No. 6,961,099, entitled METHOD AND APPARATUS FOR AUTOMATICALLY SWITCHING BETWEEN ANALOG AND DIGITAL INPUT SIGNALS, the contents of which are hereby incorporated by reference.

BACKGROUND

Typical home entertainment systems include a television, a VHS tape machine, and some type of set-top box (e.g., a cable box). Sophisticated systems might also include such components as a radio receiver, a CD player, a pair of speakers, a karaoke, and a DVD player. The possibility of adding and combining many disparate audio and video input sources requires that at least one of the interconnected components enable users to select from various input sources and to appropriately configure the desired audio/video output source. Unfortunately, finding the correct configuration of components to display a desired audio/video presentation often requires a viewer to employ a number of different remote-control devices and user interfaces to arrive at the correct combination of device configurations. Experienced users of such systems can attest to the difficulty of finding the appropriate settings for each case; less experienced users find the task even more exasperating.

In view of the above, there is a need to provide consumers with simplified systems of devices, and preferably systems that can be controlled using a single, simple user interface. The IEEE 1394 system architecture, also known as the "FireWire® System Architecture," addresses this need. ("FireWire" is a registered trademark of Apple Computer.) FireWire®-compliant devices assign six-bit physical identifiers to each device connected to a FireWire® serial bus. The FireWire®-compliant devices then use these physical identifiers to uniquely identify themselves on the bus. Whenever a new device is added to the bus, an existing device is removed from the bus, or both, a bus reset initiates certain well-known bus recovery communications and functions in accordance with the FireWire® standard. The bus reset then repeats the process of uniquely identifying each device on the bus.

The ability to uniquely identify each device in a home entertainment system greatly reduces the complexity required to display a desired program. For example, if a viewer issues a command to a FireWire®-capable television (via an infrared remote control, for example) to play a video disk in a FireWire®-capable DVD player, then the television would automatically communicate with the appropriate player over the bus to receive and display the contents of the video disk.

Most consumers who might consider purchasing an advanced entertainment system already own one or more older "legacy" devices and may have content stored using a legacy format. For example, a consumer interested in purchasing a recent model digital television may have a VHS machine, a collection of analog VHS tape recordings, and a set-top box equipped to deliver analog broadcast programming. The consumer will not likely wish to part with some or all of these. It is therefore important for manufacturers of the latest consumer electronics to provide support for older "legacy" devices.

FIG. 1 (prior art) depicts a system 100 in which a digital television (DTV) 105 and digital VCR (DVCR) 110 communicate via a digital FireWire® channel 115 and, to support legacy VHS recordings, an analog channel 120. Both digital television 105 and digital VCR 110 are assumed to communicate using the IEEE 1394a standard. In one example, the devices of system 100 communicate in accordance with EIA 775, which defines a specification for a baseband digital interface to a digital television using the IEEE 1394 standard.

DTV 105 includes a display 125, a digital interface 130, and a switch 135. Interface 130 controls switch 135 to select between digital channel 115 and analog channel 120. DVCR 110 conventionally includes a panel subunit 140 and a VCR subunit 145. Panel subunit 140 communicates with digital interface 130 using the FireWire® standard, and VCR subunit 145 reads both analog and digital video recordings. VCR subunit 145 provides digital signals to DTV 105 via panel subunit 140 and digital channel 115, and provides analog signal to DTV 105 via analog channel 120.

In the absence of some sort of intelligent interface, the user of system 100 would have to know at any given moment whether the output of the DVCR 110 was an analog signal or a digital signal. The user would then have to instruct DTV 105 to select the appropriate analog or digital input. Requiring the user to make such decisions can be confusing, especially if DVCR 110 can play tapes that include both analog and digital information.

The FireWire® standard addresses this problem by providing an intelligent means of automatically switching between analog channel 120 and digital channel 115 without requiring user input. When switching between analog and digital outputs, DVCR 110 can issue a FireWire® standard "CONNECT" command over digital channel 115 to instruct digital interface 130 to issue the appropriate video-select command on port VS to switch 135. The user is thus relieved from the burden of having to manually switch between video signals. FireWire®-compliant systems that employ the EIA 775 protocol issue a CONNECT command with an EIA 775 "descriptor" specifying the analog_input_plug_ID as the destination plug.

FIG. 2 depicts an entertainment system 200 in which a digital television 205 is connected to two audio/video devices 210 and 215. In the depicted example, DTV 205 is a FireWire®-compliant digital television, and devices 210 and 215 are a FireWire®-compliant digital VCR and a FireWire®-compliant digital set-top box, respectively. All three devices include analog communication channels to support legacy communication.

DTV 205 includes an analog tuner 220, some FireWire®-compliant digital interface circuitry 225, a video selection circuit 230 controlled by a user interface 235, a video processor 242 to interpret incoming video signals, and a display 244 for presenting the interpreted video signals to users (i.e., viewers). Video selection circuit 230 includes three analog video channels AV0-AV2 connected to three respective analog input jacks 245. Video selection circuit 230 also includes a digital video channel DV# that receives digital video signals from three digital communication jacks 250 via digital interface circuitry 225 and a FireWire® bus 255.

User interface 235 receives commands from the control panel (not shown) on DTV 205 and via an infrared receiver 260 that receives infrared instructions from a remote control 265. User interface 235 connects to video selection circuit 230 and issues video select commands VS as directed by the user. In some embodiments, selection circuit 230 enables DTV 205 to simultaneously display the contents of more than one video input to selection circuit 230. For example, DTV 205 can simultaneously display a user interface and broadcast video from an analog or digital broadcast, and embodiments that support picture-in-picture (PIP) can simultaneously receive and display data from two analog channels, two digital channels, or one analog and one video channel.

Digital interface circuitry 225 communicates with devices 210 and 215 via digital video channels DV1 and DV2. Because interface circuitry 225 and devices 210 and 215 are all FireWire® compliant, interface circuitry 225 can distinguish between devices 210 and 215. User instructions received by user interface 235 can therefore be directed to the appropriate one of devices 210 and 215, and digital interface circuitry 225 can direct digital video streams from devices 210 and 215 to video selection circuit 230. Assuming, for example, that device 210 is a digital video recorder, a user can instruct DTV 205 to play videotape in device 210. Such an instruction would cause user interface 235 to command video selection circuit 230 to select digital video input DV# and to issue a "play" instruction to device 210 via digital interface circuitry 225 and bus 255. In this way, the user can specify the output of either device 210 or 215 with a simple command to DTV 205.

A problem can arise when one of devices 210 or 215 provides an analog output signal on its respective analog video output AV. As noted above, the FireWire® standard allows compliant devices to issue a "CONNECT" command causing DTV 205 to switch to an analog input. However, DTV 205 has no way of telling which of analog input jacks 245 is connected to the requesting device. Thus, a request to switch the input of DTV 205 to one of analog input jacks 245 may cause DTV 205 to display the correct video, video from the wrong device, or nothing at all. For example, if device 210 issues a command to switch to an analog input while device 215 is also active, DTV 205 might display broadcast video from antenna 270 or the analog signal from device 215. The user would then have to either physically swap analog input connectors to jacks 245 until the appropriate signal is displayed, or would have to employ user interface 235 to manipulate video selection circuit 230. The user would then have to repeat this process from time to time, depending on the selected device and the analog input currently selected by circuit 230.

Requiring the user to manually select the appropriate video input or rearrange physical connections can be confusing; indeed, this is part of the reason the FireWire® standard was adopted. Unfortunately, the unique identifiers used by FireWire®-compliant devices do not exist for analog signals. There is therefore a need for a way to uniquely identify a number of analog channels to relieve the user of the burden of manually selecting from among them.

SUMMARY

The present invention is directed to an entertainment system that includes a digital receiver (e.g., a digital television) and a number of analog/video sources, for example a digital VCR and a digital set-top box. The television and the sources each support at least one form of legacy communication standard, such as the analog National Television System Committee (NTSC) Standard, and are therefore connected to the receiver via both analog and digital communication channels.

In accordance with the invention, the receiver can be configured to uniquely identify the sources associated with each analog channel. Uniquely identifying the analog sources allows the receiver to issue digital commands to the source of analog signals without requiring the user to manually select from among analog sources.

The scope of the invention is defined by the claims, and not by this summary.

Figure 5A:
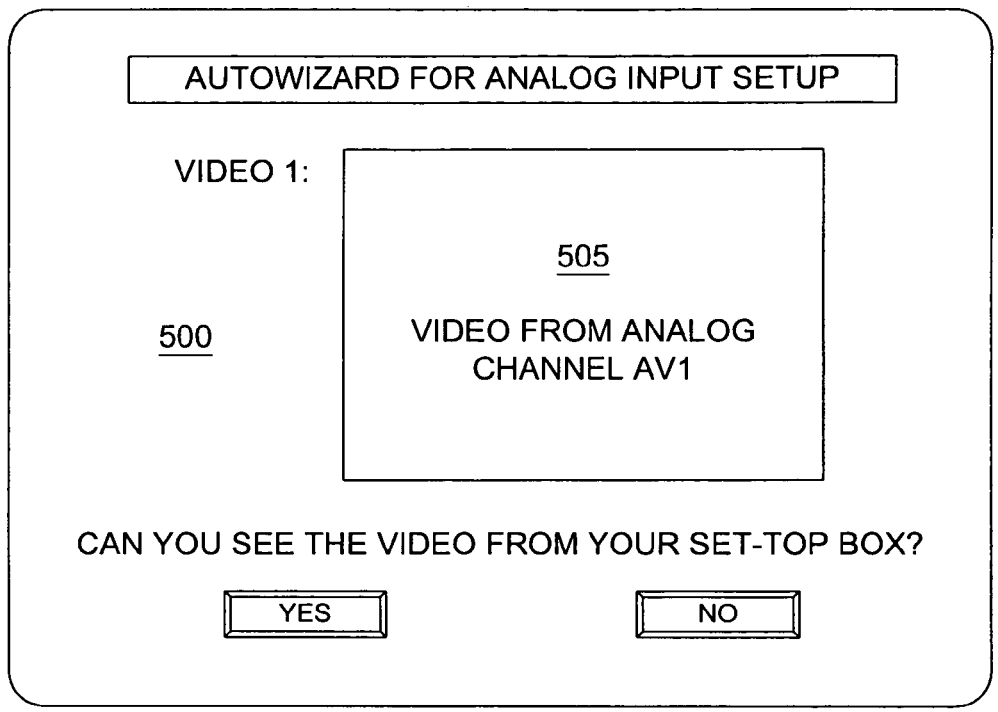

This specific graphical user interface—sometimes referred to as a "screen wizard"—presents a screen similar to screen 500 of FIG. 5A.

Figure 5B:
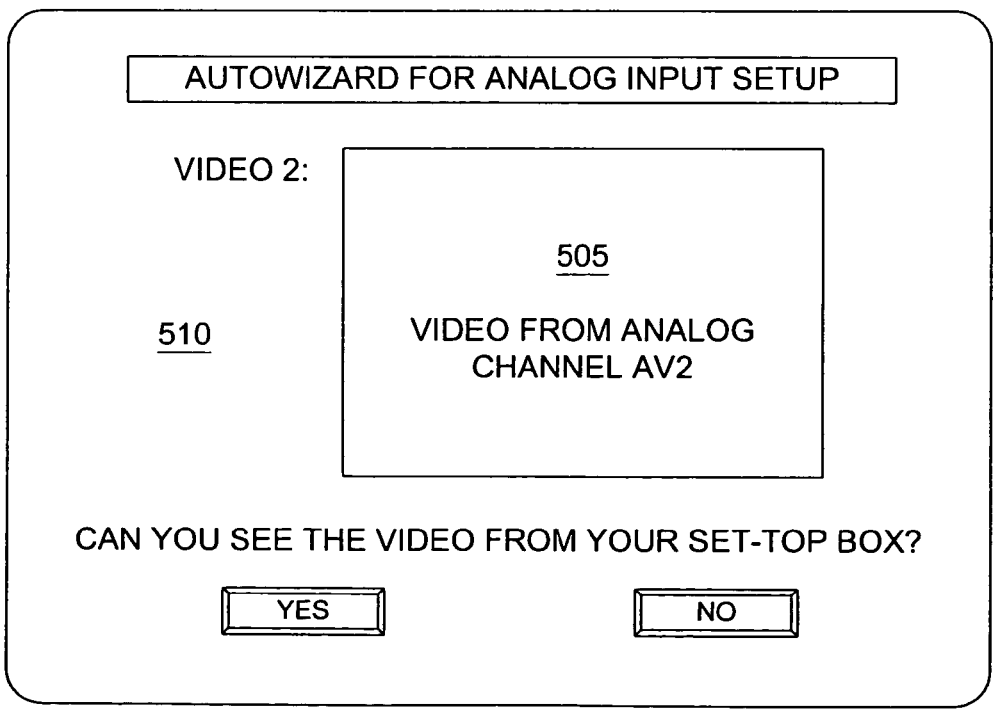

FIGS. 5A and 5B depict screens 500 and 510 of a graphical user interface with which users interact to automate the selection of analog input channels for digital devices adapted to support analog legacy communication.

Figure 6:
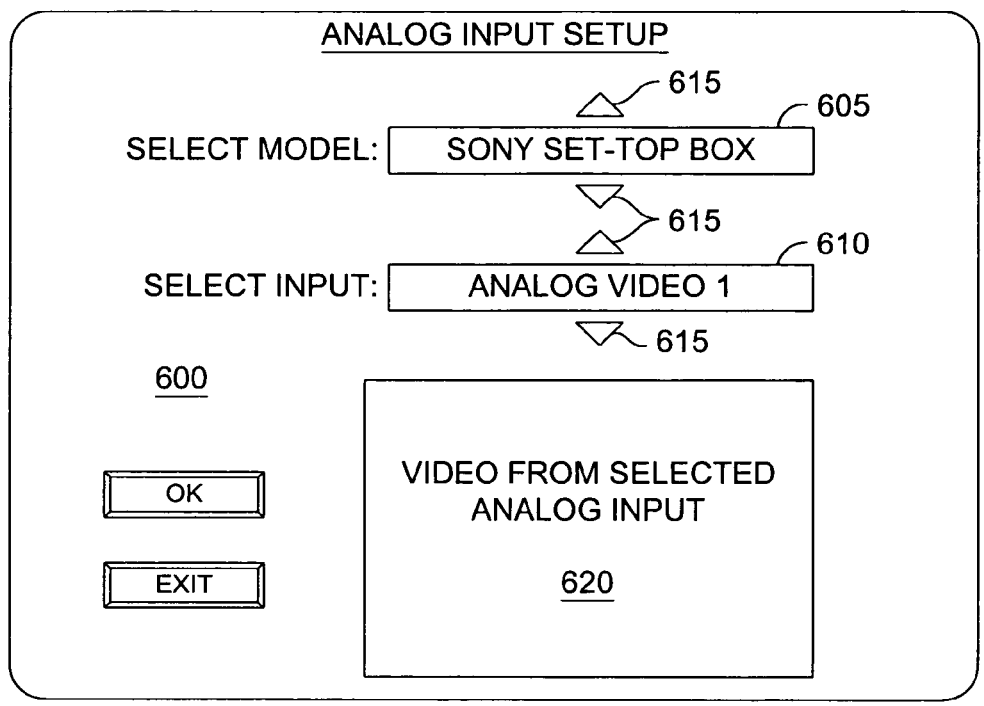

FIG. 6 depicts an alternative interactive screen 600 with which users might interact to automate the selection of analog input channels for digital devices adapted to support analog legacy communication.

Figure 7:
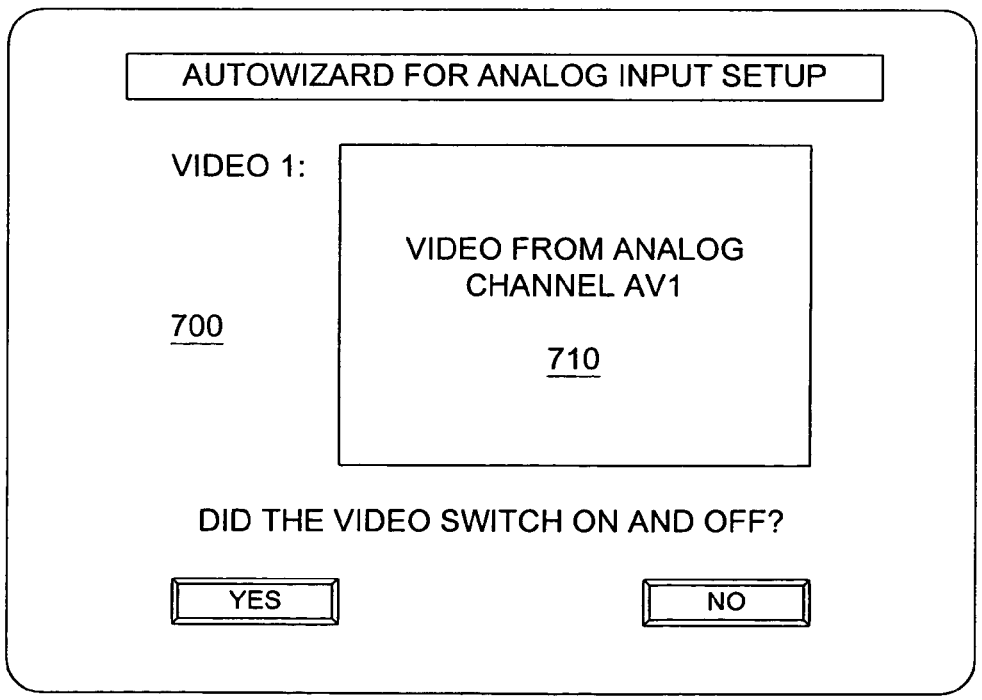

FIG. 7 depicts yet another interactive screen 700 with which users might interact to automate the selection of analog input channels for digital devices adapted to support analog legacy communication.

DETAILED DESCRIPTION

Figure 1:
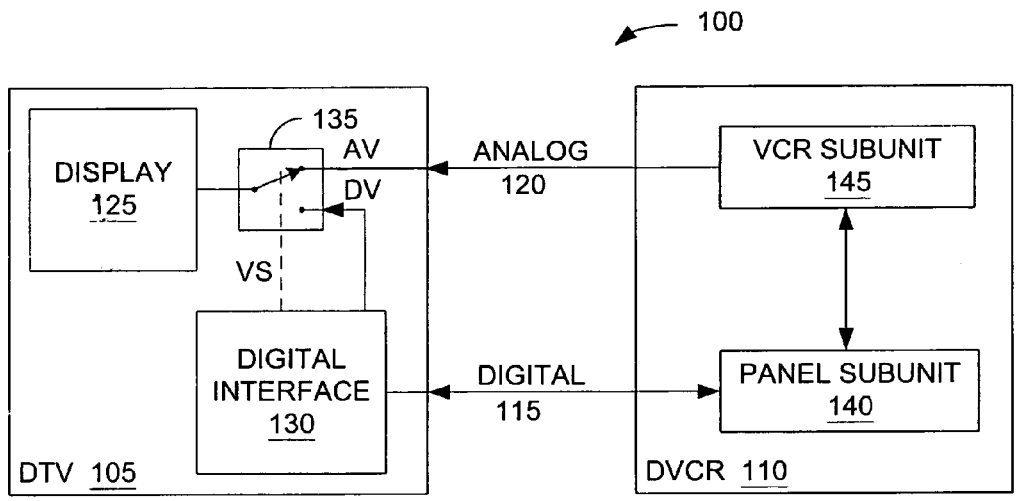
FIG. 1 (prior art) depicts a system 100 in which a digital television (DTV) 105 and digital VCR (DVCR) 110 communicate via a digital FireWire® channel 115 and, to support legacy VHS recordings, an analog channel 120.
Figure 2:
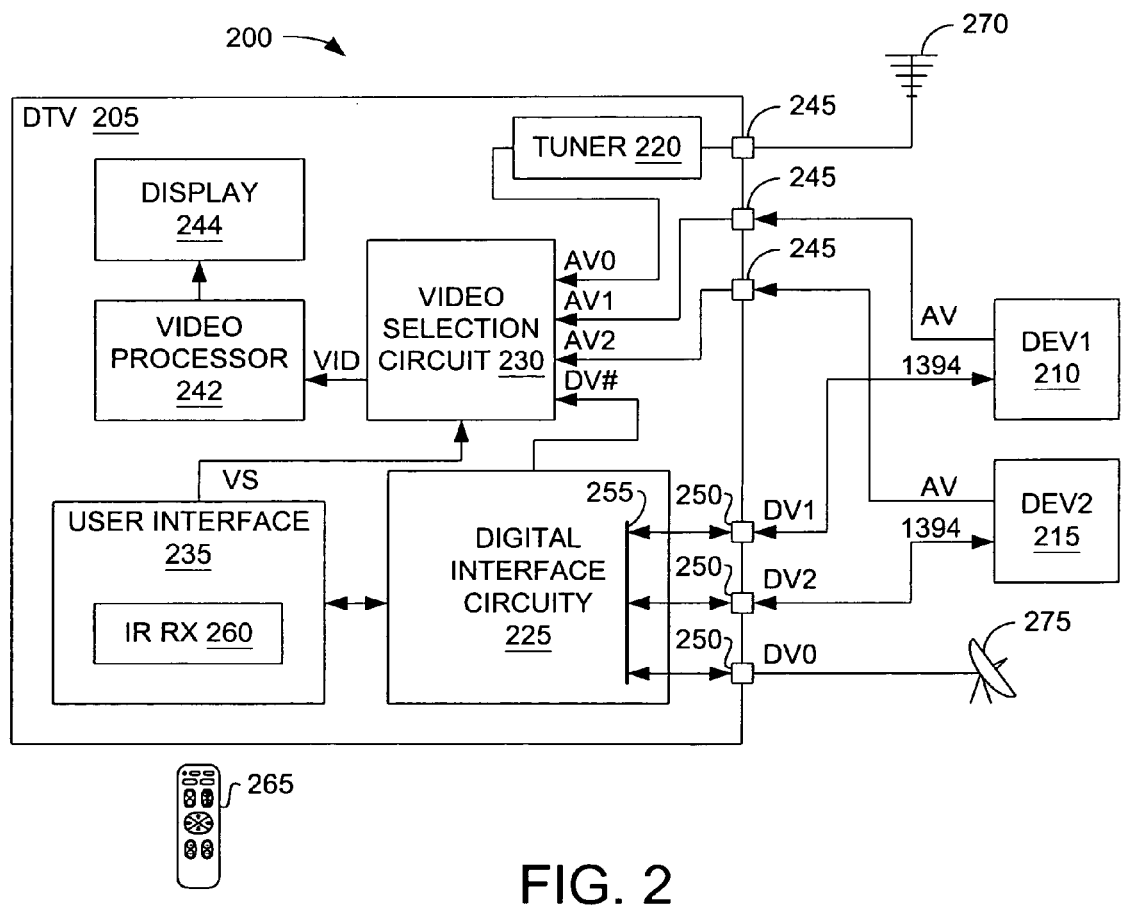
FIG. 2 depicts an entertainment system 200 in which a digital television 205 is connected to two audio/video devices 210 and 215.
Figure 3:
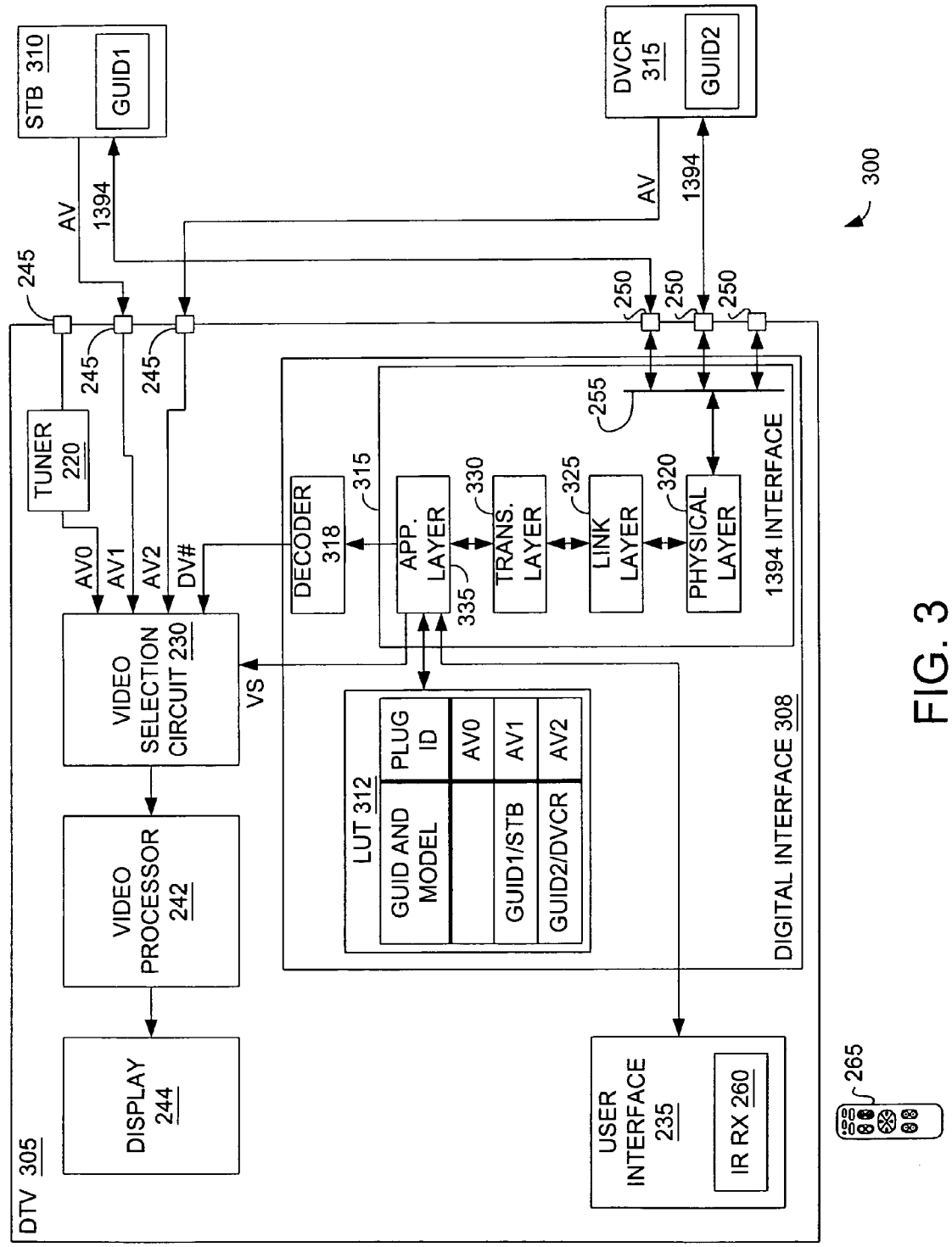
FIG. 3 depicts an entertainment system 300 in accordance with one embodiment of the invention.

FIG. 3 depicts an entertainment system 300 in accordance with one embodiment of the invention. Some components of system 300 are similar to those of system 200 of FIG. 2, like-numbered elements being the same. System 300 includes a DTV 305 connected to analog and digital ports of a set-top box 310 and a digital VCR 315 via respective pairs of analog and digital video links, or channels. In accordance with the invention, DTV 305 is modified to uniquely identify analog input signals, relieving the user of having to manually select from among multiple analog input signals.

DTV 305 conventionally includes display 244, video processor 242, video selection circuit 230, and user interface 235 like those described above in connection with DTV 205 of FIG. 2. Unlike DTV 205, however, DTV 305 includes a modified digital interface 308 designed to seek and store information allowing DTV 305 to uniquely identify analog inputs from among the FireWire®-compliant devices connected to analog input jacks 245. Digital interface 308 includes a lookup table 312 for storing this information. Digital interface 308 also includes a conventional digital video decoder 318.

Digital interface 308 includes a 1394 (FireWire®) interface 315, which in turn includes a number of FireWire® layers. These layers include a physical layer 320, a link layer 325, a transaction layer 330, and an application layer 335. In accordance with the depicted embodiment, application layer 335 is adapted to communicate with lookup table 312 as described below in connection with FIG. 4. For a detailed treatment of the IEEE 1394 standard, including the various layers of 1394 interface 315, see "FireWire® System Architecture, Second Edition, IEEE 1394a," by Don Anderson, copyright 1999 by MindShare, Inc., which is incorporated herein by reference. In one embodiment, the devices of system 300 communicate in accordance with the EIA 775 specification. For a detailed treatment of the EIA 775 specification, see the 29 Oct. 1998 "Draft EIA-775, DTV 1394 Interface Specification" (Document DEIA775Q) edited by Shazia Azhar, which is also incorporated herein by reference.

Set-top box 310 and digital VCR 315 conventionally include globally unique identifiers GUID1 and GUID2, respectively, which serve to uniquely identify set-top box 310 and digital VCR 315 on bus 255. 1394 interface circuitry 315 also includes a globally unique identifier, though this is not shown.

In accordance with the invention, lookup table (LUT) 312 correlates devices on bus 255 with associated analog channels connected to analog input jacks 245. Lookup table 335 includes one entry for each of analog input jacks 245, or three entries in the example. Lookup table 312 includes some conventional non-volatile memory for storing a unique identifier for each device connected to one of analog input jacks 245. In the example, lookup table 312 includes a number of device fields to store the GUID and an optional numerical designation for the device model for each source connected to an analog input jack 245. Lookup table 312 is shown partially filled, with GUID1 of the set-top box in the device field associated with analog video input AV1 and GUID2 of the digital VCR in the device field associated with the one of jacks 245 associated with analog video input AV2. If the analog outputs from STB 310 and DVCR 315 to DTV 305 were reversed, then GUID1 of the set-top box would instead be in the field associated with analog video input AV2 and GUID2 of the digital VCR would instead be in the field associated with the analog video input AV1. The manner of filling in the appropriate fields in lookup table 312 is described below in connection with FIG. 4.

The information in lookup table 312 allows DTV 305 to uniquely identify analog inputs from devices connected to bus 255. For example, if a viewer, using remote control 265, instructs DTV 305 to play an analog videotape in digital VCR 315, then VCR 315 will issue a "CONNECT" command instructing digital interface circuitry 308 to select the analog output from digital VCR 315. Interface 315 then, knowing the GUID and model of the device issuing the "connect" command from the presence of this information in the command header, refers to lookup table 312 to determine which analog video input corresponds to the requesting device. In the depicted example, lookup table 312 correlates GUID2 of VCR 315 with analog video input AV2, so lookup table 312 returns plug identifier AV2 in response to the query from application layer 335 of 1394 interface 315. Application layer 335 thus issues a video-select command on port VS instructing video selection circuit 230 to select analog channel AV2.

Figure 4:
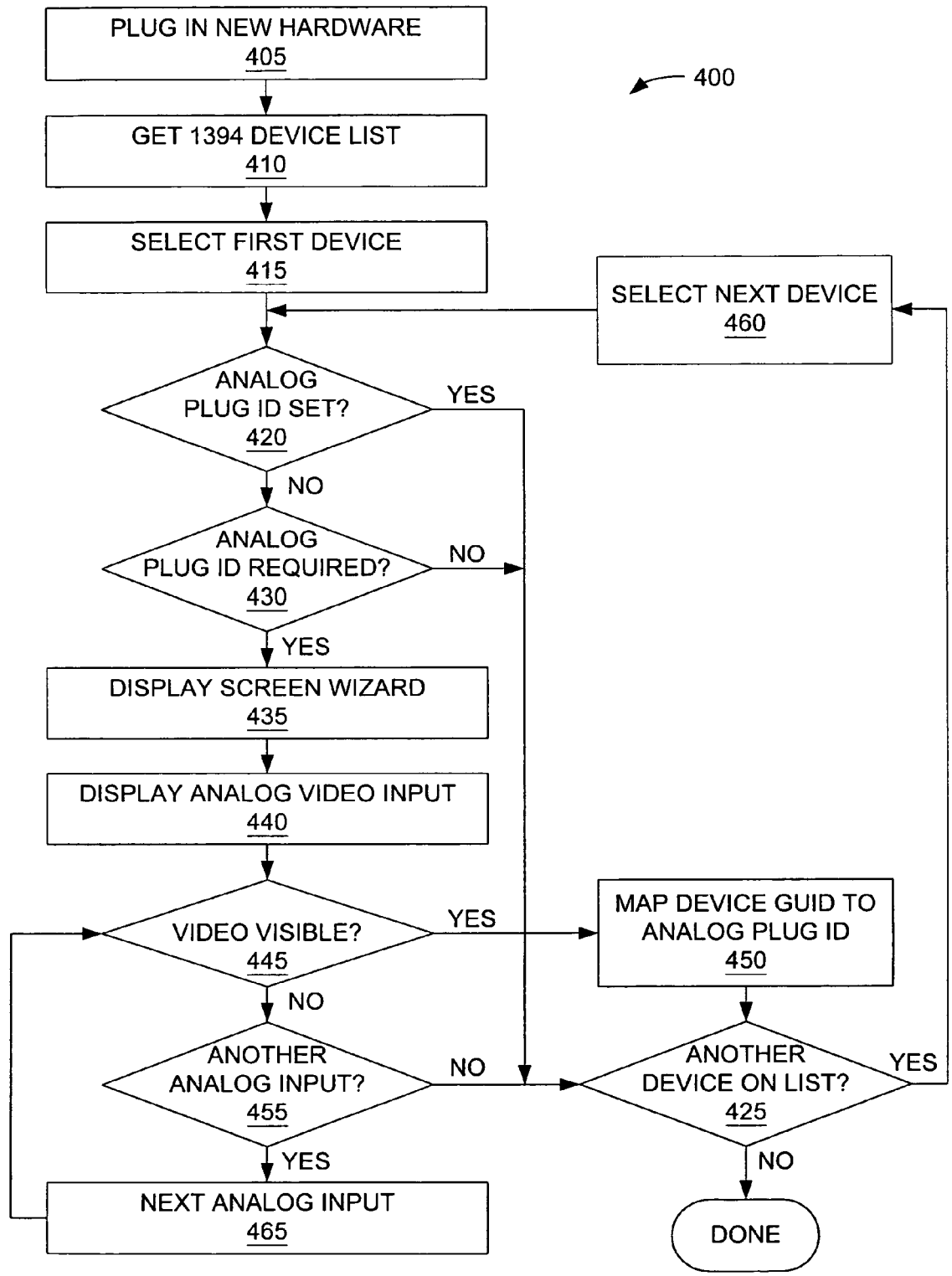
FIG. 4 depicts a method 400 of filling in lookup table 335 to correctly correlate analog input channels with the sources of the associated analog input signals.

FIG. 4 depicts a method 400 of filling in lookup table 312 to correctly correlate analog input channels with the sources of the associated analog input signals. Before lookup table 335 can correlate analog outputs with their respective devices, the unique identifiers (GUIDs) and model designations associated with those devices are entered into the appropriate fields in lookup table 312. In accordance with the FireWire® standard, the GUIDs and model information are available in each device's configuration ROM.

Beginning at step 405, a user plugs in a new piece of FireWire®-compliant hardware, such as a set-top box or digital VCR. The addition of the new hardware conventionally causes a bus reset, during which 1394 interface 315 acquires a list of devices on bus 255 (step 410). Next, interface 315 selects the first device on the list (step 415) and uses the GUID to determine whether an analog plug ID has been specified in lookup table 312 for the selected device (step 420). If a plug ID has already been specified for the selected device, interface 315 moves the process to decision 425 and determines whether to consider another device. If no plug ID has been specified for the selected device, interface 315 moves the process to decision 430, in which interface 315 determines whether an analog plug ID is required for the specified device. Some FireWire®-compliant devices may not support analog legacy communications, and therefore will not require an analog plug.

If no plug ID is required, the process again moves to step 425; otherwise, interface 315 provides a graphical user interface to display 244 (step 435) seeking input from the user. This specific graphical user interface—sometimes referred to as a "screen wizard" or "autowizard"—presents a screen similar to screen 500 of FIG. 5A.

Referring to FIG. 5A, screen 500 includes a window 505 displaying video derived from whichever analog input channel is selected by video selection circuit 230 of FIG. 3 (step 440). Screen 500 prompts the viewer to select either a "yes" icon or a "no" icon, depending upon whether window 505 displays the appropriate analog signal. FIG. 4 depicts the user's decision as decision 445.

If the answer is yes, then interface 315 fills in the field of lookup table 312 associated with the selected analog video input to map the GUID of the selected device to the appropriate analog plug ID. On the other hand, if the answer to decision 445 is no, then interface 315 determines whether there are additional analog input channels left to try (step 455). If so, interface 315 switches video selection circuit 230 to the next available analog input channel (step 465) and presents a screen similar to screen 510 of FIG. 5B to the user.

Referring to FIG. 5B, screen 510 is like screen 500 of FIG. 5A, except window 505 displays video selected from analog input channel AV2. The process of FIG. 4 then returns to step 445 and continues until either the correct video input is found and mapped in lookup table 312 or there are no more analog input channels to try. In either case, the process moves to step 425, in which interface 315 determines whether there is another listed device: if so, the next device is selected (step 460) and the process returns to step 420; otherwise, the set-up process is finished.

In an embodiment that employs the EIA 775 protocol for digital communications, the device seeking to have DTV 305 switch between analog and digit input channels issues a CONNECT command specifying "any available external plug" in the EIA-775 descriptor as the destination plug. DTV 305 then selects the correct connection based on the information in lookup table 312. DTV 305 can thus automatically manage analog inputs from multiple digital products.

FIG. 6 depicts an alternative interactive screen 600 with which users might interact to automate the selection of analog input channels for digital devices adapted to support analog legacy communication. Screen 600 includes a source-identification field 605, an analog input field 610, and arrow icons 615. Using the up and down arrows 615 associated with source-identification field 605, users can select from among the list of devices generated after a bus reset. In the depicted example, a user has selected a Sony Set-Top box and is interested in assigning that box the appropriate analog video input. Analog input field 610 shows the user which analog input is currently selected, and a window 620 displays video from that source. Up and down arrows 615 associated with field 610 allow the user to select from among the available analog input channels. The user knows the settings are correct when window 620 displays the video from the selected device. The user then selects the "OK" button, and the settings from fields 605 and 610 are used to update lookup table 312

(FIG. 3). This process can be repeated for any number of devices. Once finished, the user can select the "Exit" button to exit screen 600.

FIG. 7 depicts an alternative interactive screen 700 with which users might interact to automate the selection of analog input channels for digital devices adapted to support analog legacy communication. Users may be confused about the source of a video presentation. If the source is misidentified, the entertainment system may incorrectly identify an analog input. For example, if the user erroneously believes an analog broadcast is the correct output from a VCR being set up in step 445 (FIG. 4), the VCR's analog output will be incorrectly mapped in LUT 312 (FIG. 3). Some embodiments avoid such potential problems. Instead of using just video content to confirm the input source, system DTV 305 might issue a command to the device for which an audio input channel is to be identified to get some special audio or visual effects. In the example of FIG. 7, DTV 305 issues an instruction to the selected device to power off and on, resulting in a visible disruption in the video from the displayed analog channel if the correct analog channel is selected. Screen 700 then asks the viewer whether the video switched off and on in place of step 445 of FIG. 4. The EIA 775 protocol defines a "POWER" command that can be used for this purpose.

While the present invention has been described in connection with specific embodiments, variations of these embodiments will be obvious to those of ordinary skill in the art. For example, while the foregoing examples involve both audio and video data, systems in accordance with the invention can be used in purely audio systems. Moreover, all or a portion of the interface and selection circuitry depicted herein as part of a digital television can be embodied in a separate component (e.g., a "set-top box") separate from a television display. Therefore, the spirit and scope of the appended claims should not be limited to the foregoing description.

What is claimed is:

1. A system comprising:
   a. a first signal source having a first analog-signal port, a first digital-signal port, and a first unique signal-source identifier; and
   b. a receiver having:
      i. a first analog input channel connected to the first analog-signal port;
      ii. a second analog input channel; and
      iii. memory having a first device field storing the first unique signal-source identifier and a first plug-identifier field associated with the first device field, and wherein the receiver associates a second device field with the second analog input channel;
      iv. wherein the receiver associates the first device field with the first analog input channel.

2. The system of claim 1, further comprising a second signal source having a second analog-signal port, a second digital-signal port, and a second unique signal-source identifier.

3. The system of claim 2, the memory having the second device field storing the second unique signal-source identifier, wherein the receiver associates the second device field with the second analog input channel.

4. The system of claim 1, wherein the first analog input channel has associated therewith a first unique analog-input-channel identifier, and wherein the second analog input channel has associated therewith a second unique analog-input-channel identifier.

5. The system of claim 4, wherein the receiver associates the first device field with the first unique analog-input-channel identifier.

6. The system of claim 1, wherein the analog and digital signals comprise video signals.

7. The system of claim 1, wherein the memory is a lookup table.

8. A system comprising:
   a. a first signal source having a first analog-signal port, a first digital-signal port, and a first unique signal-source identifier; and
   b. a receiver having:
      i. a first analog input channel connected to the first analog-signal port;
      ii. a second analog input channel; and
      iii. a lookup table having a first device field storing the first unique signal-source identifier and a first plug-identifier field associated with the first device field;
      iv. wherein the receiver associates the first device field with the first analog input channel.

* * * * *